(12) United States Patent
Finnigan

(10) Patent No.: US 8,433,043 B2
(45) Date of Patent: *Apr. 30, 2013

(54) TELEPHONIC VOICE MESSAGE TRANSMISSION CONTROL METHOD

(75) Inventor: Paul F. Finnigan, Los Gatos, CA (US)

(73) Assignee: Worldvoice Licensing, Inc., Washington, DC (US)

( * ) Notice: Subject to any disclaimer, the term of this patent is extended or adjusted under 35 U.S.C. 154(b) by 94 days.

This patent is subject to a terminal disclaimer.

(21) Appl. No.: 11/798,615

(22) Filed: May 15, 2007

(65) Prior Publication Data

US 2008/0031431 A1 Feb. 7, 2008

Related U.S. Application Data

(60) Continuation of application No. 10/868,842, filed on Jun. 17, 2004, now Pat. No. 7,224,779, which is a continuation of application No. 10/656,162, filed on Sep. 8, 2003, now Pat. No. 7,221,744, which is a continuation of application No. 09/756,693, filed on Jan. 9, 2001, now Pat. No. 6,697,459, which is a division of application No. 08/817,443, filed on Aug. 22, 1997, now Pat. No. 6,173,043, which is a continuation-in-part of application No. 08/684,318, filed on Jul. 18, 1996, now Pat. No. 5,687,220, which is a continuation of application No. 08/332,102, filed on Oct. 31, 1994, now abandoned.

(30) Foreign Application Priority Data

Oct. 31, 1995 (WO) ...................... PCT/US95/14204

(51) Int. Cl.
H04M 3/50 (2006.01)

(52) U.S. Cl.
USPC ...................... 379/88.22; 375/130; 379/88.12; 379/88.17; 379/88.18; 379/88.23; 379/211.02; 709/246

(58) Field of Classification Search ............... 379/88.26, 379/88.17, 88.22, 88.23, 88.12, 88.18, 211.02; 375/130, 135; 709/246
See application file for complete search history.

(56) References Cited

U.S. PATENT DOCUMENTS

| 4,277,649 A | 7/1981 | Sheinbein |
|---|---|---|
| 4,313,035 A | 1/1982 | Jordan et al. |

(Continued)

FOREIGN PATENT DOCUMENTS

| EP | 0 485 980 | 5/1992 |
|---|---|---|
| EP | 0485980 | 5/1992 |

(Continued)

OTHER PUBLICATIONS

C.R. Baugh, "Why Wait for PCS? Personalized Portable Telephone Services are Here Today," Wireless Communications, pp. 41-44 (Mar. 1994).

(Continued)

*Primary Examiner* — Gerald Gauthier
(74) *Attorney, Agent, or Firm* — McKenna Long & Aldridge LLP

(57) ABSTRACT

The present invention is directed to a method of controlling transmission of voice messages or information via telephonic voice message systems, which are sometimes referred to as Voice Mail Systems. Users of the system selectively specify voice message transmission instructions for controlling transmission of voice messages directed to them. Upon receipt of a user's voice message address, the voice message system determines whether the destination voice message address has a specified voice message transmission instruction previously selected by the recipient and processes the voice message in accordance with the instruction.

28 Claims, 3 Drawing Sheets

U.S. PATENT DOCUMENTS

| | | | |
|---|---|---|---|
| 4,371,752 A * | 2/1983 | Matthews et al. ........... | 379/88.26 |
| 4,602,129 A | 7/1986 | Matthews et al. | |
| 4,625,081 A | 11/1986 | Lotito et al. | |
| 4,640,991 A | 2/1987 | Matthews et al. | |
| 4,752,951 A | 6/1988 | Konneker | |
| 4,757,525 A | 7/1988 | Matthews et al. | |
| 4,790,003 A | 12/1988 | Kepley et al. | |
| 4,837,798 A | 6/1989 | Cohen et al. | |
| 4,939,771 A | 7/1990 | Brown et al. | |
| 4,942,598 A | 7/1990 | Davis | |
| 5,014,300 A | 5/1991 | Haravth et al. | |
| 5,029,196 A | 7/1991 | Morganstein | |
| 5,029,199 A | 7/1991 | Jones et al. | |
| 5,033,077 A * | 7/1991 | Bergeron et al. ........... | 379/88.12 |
| 5,036,533 A | 7/1991 | Carter et al. | |
| 5,109,405 A | 4/1992 | Morganstein et al. | |
| 5,127,003 A | 6/1992 | Doll, Jr. et al. | |
| 5,153,905 A * | 10/1992 | Bergeron et al. ........... | 379/88.23 |
| 5,181,236 A | 1/1993 | LaVallee et al. | |
| 5,193,110 A | 3/1993 | Jones et al. | |
| 5,243,643 A | 9/1993 | Sattar et al. | |
| 5,260,986 A | 11/1993 | Pershan | |
| 5,274,696 A | 12/1993 | Perelman | |
| 5,276,731 A | 1/1994 | Arbel et al. | |
| 5,278,897 A | 1/1994 | Mowery et al. | |
| 5,301,226 A | 4/1994 | Olson et al. | |
| 5,317,627 A * | 5/1994 | Richardson et al. ........ | 379/88.17 |
| 5,327,486 A | 7/1994 | Wolff et al. | |
| 5,329,578 A | 7/1994 | Brennan et al. | |
| 5,341,396 A * | 8/1994 | Higgins et al. ................. | 375/130 |
| 5,361,295 A | 11/1994 | Solomon et al. | |
| 5,384,831 A | 1/1995 | Creswell et al. | |
| 5,388,151 A * | 2/1995 | Khalid et al. ............... | 379/88.12 |
| 5,408,528 A | 4/1995 | Carlson et al. | |
| 5,418,835 A | 5/1995 | Frohman et al. | |
| 5,422,936 A | 6/1995 | Atwell | |
| 5,432,841 A | 7/1995 | Rimer | |
| 5,452,289 A | 9/1995 | Sharma et al. | |
| 5,454,030 A | 9/1995 | De Oliverira et al. | |
| 5,459,584 A | 10/1995 | Gordon et al. | |
| 5,469,500 A | 11/1995 | Satter et al. | |
| 5,471,470 A | 11/1995 | Sharma et al. | |
| 5,473,667 A | 12/1995 | Neustein | |
| 5,493,607 A | 2/1996 | Arumainayagam et al. | |
| 5,493,692 A | 2/1996 | Theimer et al. | |
| 5,500,859 A | 3/1996 | Sharma et al. | |
| 5,506,888 A | 4/1996 | Hayes et al. | |
| 5,509,000 A | 4/1996 | Oberlander | |
| 5,513,126 A | 4/1996 | Harkins et al. | |
| 5,555,376 A | 9/1996 | Theimer et al. | |
| 5,559,860 A | 9/1996 | Mizikovsky | |
| 5,574,725 A | 11/1996 | Sharma et al. | |
| 5,610,970 A | 3/1997 | Fuller et al. | |
| 5,627,764 A | 5/1997 | Schutzman et al. | |
| 5,661,782 A | 8/1997 | Bartholomew et al. | |
| 5,675,507 A | 10/1997 | Bobo, II | |
| 5,675,631 A | 10/1997 | Kaminsky et al. | |
| 5,680,442 A | 10/1997 | Bartholomew et al. | |
| 5,689,642 A | 11/1997 | Harkins et al. | |
| 5,740,230 A | 4/1998 | Vaudreuil | |
| 5,740,231 A | 4/1998 | Cohn et al. | |
| 5,742,905 A | 4/1998 | Pepe et al. | |
| 5,745,551 A | 4/1998 | Strauch et al. | |
| 5,751,792 A | 5/1998 | Chau et al. | |
| 5,787,153 A * | 7/1998 | Bankay et al. ............. | 379/88.18 |
| 5,825,865 A | 10/1998 | Oberlander et al. | |
| 5,870,549 A | 2/1999 | Bobo, II | |
| 5,909,483 A | 6/1999 | Weare et al. | |
| 6,173,043 B1 | 1/2001 | Finnigan | |
| 6,350,066 B1 | 2/2002 | Bobo, II | |
| 6,697,459 B2 * | 2/2004 | Finnigan .................... | 379/88.18 |
| 7,221,744 B2 | 5/2007 | Finnigan | |
| 7,221,745 B2 | 5/2007 | Finnigan | |
| 7,224,779 B2 * | 5/2007 | Finnigan .................... | 379/88.23 |
| 2001/0043683 A1 * | 11/2001 | Wilson et al. ............. | 379/88.16 |

FOREIGN PATENT DOCUMENTS

| | | |
|---|---|---|
| EP | 0 560 111 | 9/1993 |
| EP | 0560111 | 9/1993 |
| EP | 0 588 101 | 3/1994 |
| EP | 0588101 | 3/1994 |
| GB | 2185363 | 7/1987 |

OTHER PUBLICATIONS

C.H. Chow et al., "Coping with Complexity" Service Specification for a Network Services Testbed, 1988 International Zurich Seminar on Digital Communications: Mapping New Applications onto New Technologies (Mar. 1988).

C.H. Chow, "Protocol Issues in Interconnecting ISDN, IN, and LAN," IEEE Region 10 Conference on Computer and Communication Systems, Hong Kong (Sep. 1990).

M.R. Croak, "Unified Messaging Will Deliver the Message," AT&T Technology, American Telephone & Telegraph Co., Short Hills, New Jersey, vol. 4, No. 2, pp. 2-5 (1989).

T.C. Feustel et al., "Personalized Communications : Concepts and Prototyping," in Abstracts of IEEE Telecommunications Conference, Conference Record vol. 1 of 3, Houston, TX (Dec. 1-4, 1986).

G. Herman et al., "The Modular Integrated Communications Environment (MICE): A System for Prototyping and Evaluating Communications Services," Proceedings of International Switching Symposium, vol. 2 of 4, Phoenix, AZ (Mar. 1987).

R. Kamel et al., "PX: Supporting Voice in Workstations," Journal Computer Directive, vol. 23, Issue 8 (Aug. 1990).

S. Rangnekar and M. Hossain, "AT&T Voice Mail Service," AT&T Technology, vol. 5, No. 4 (Nov. 4, 1990).

B. Redman, "A User Programmable Telephone Switch," EUUG Conference, Helsinki (May 1987).

S.Schmandt, "Phonetool: Integrating Telephones and Workstations," Global Telecommunications Conference and Exhibition: Communications Technology for the 1990s and Beyond (1989).

A.M. Shivji and J. Johansen, "Voice Mail Internetworking Using X.400," Proceedings of the IFIP WG6.5 International Symposium on Message Handling Systems and Application Layer Communication Protocols, Zurich, Switzerland (Oct. 1990).

K. Siuda, "Security Services in Telecommunications Networks," Digital Communications (Mar. 1988).

D. Swinehart, "Telephone Management in the Etherphone System," Proceedings of Globecom '87, IEEE Globecom (Nov. 1987).

D. B. Terry and D. Swinehart, "Managing Stored Voice in the Etherphone System," Proceedings of Eleventh ACM Symposium on Operating System Principles, Austin, TX (Nov. 1987).

P.T. Zellweger et al., "An Overview of the Etherphone System and its Applications," Proceedings of the $2^{nd}$ IEEE Conference on Computer Workstations, IEEE, New York, pp. 160-168 (1988).

R. Vickers, "Evolution of Switch Architecture and Technology," Digital Communications (Mar. 1988).

C.C. Wong, "Personal Communications," M.S. Thesis, Media Arts and Sciences, MIT Media Laboratory (Jun. 1991).

Memorandum Order dated Nov. 9, 2010.

Skype Technologies SA and Skype, Inc.'s Answer to Amended complaint for Patent Infringement and Counterclaims dated Nov. 23, 2010.

Joint Proposed Scheduling Order Dated Dec. 8, 2010.

Plaintiffs Eidos Communications, LLC's and Message Routes, LLC's Answer to Defendant's Counterclaims dated Dec. 9, 2010.

Joint Proposed Scheduling Order Dated Dec. 10, 2010.

R.P. Uhlig, "Computer Messaging Systems," Proceedings of the IFIP TC 6 Symposium on Computer Messaging Systems, Ottawa, Canada (Apr. 1981).

Herman et al. "The Modular Integrated Communications Environment (MICE): A system for prototyping and evaluation communications services", Bell Communications Research, 1986.

Brian E. Redman, "A user programmable telephone switch", Bell Communications Research, Australian Unix systems user group newsletter, vol. 8, No. 6, pp. 35-46, 1987.

Chi Chong Wong, "Personal Communications", The Massachusetts Institute of Technology's ACME System (1991).

Kamel et al. "PX: Supporting Voice in workstations", Bell-Northern Research, Aug. 1990.

Etherphone: Collected Papers 1987-1988, Xerox Palo Alto Research Center, 1987.

Shasha Loeb, "Architecting Personalized Delivery of Multimedia", Communications of the ACM, vol. 25, No. 12, (Dec. 1992).

Malone et al. "The Information Lens: An intelligent system for information sharing in organization", Center for Information Systems Research, Massachusetts Institute of Technology, Jan. 1986.

Schmandt et al. "Phone Slave: A graphical telecommunications interface", Proceedings of the SID, vol. 26, No. 1, 1985.

Eric Thich Vi Ly, "Chatter: A conversational telephone agent", Massachusetts Institute of Technology, Jun. 1993.

Rosenberg et al. "An overview of the Andrew Message System: A portable, distributed system for multimedia electronic communication", Information Technology Center, Carnegie Mellon University, Jul. 1987.

J.B. Postel, "Simple Mail Transfer Protocol", RFC 821, (Aug. 1982) ("SMTP").

French et al. "The Zephyr Programmer's Manual", Protocol Version ZEPH0.2, Apr. 5, 1989.

Sharon Belville, "Zephyr on Athena", Athena Documentation, Version 3, Sep. 10, 1991.

Mark Weiser, "Some computer science issues in ubiquitous computing", to appear in CACM, Jul. 1993.

Want et al. "Expanding the horizons of location-aware computing", pp. 31-34, Aug. 2001.

William Noah Schilit, "A system architecture for context-aware mobile computing", Columbia University, 1995.

D.B. Terry, "7 Steps to a Better Mail System," Message Handling Systems and Application Layer Communication Protocols, P. Schicker and E. Stefferud (Eds.), Elsevier Science Publishers B.V. (1991).

Schmandt et al. "Phonetool" Integration telephones and workstations, The Massachusetts Institute of Technology's & University of Southern California's PhoneTool System (1989).

Bob Weiner, "PIEmail: A Personalized Information Environment Mail Tool", Brown University, Department of Computer Science Master's Thesis, May 1992.

VOX Audio Server, Olivetti Research California, Version 1.0, Jan. 1990.

Terry et al. "Continuous Queries over Append-Only databases", Xerox Corporation, Palo Alto Research Center, 1992.

Adams et al. "An Infrared Network for mobile computers", Proceedings USENIX Symposium on Mobile & Location-independent computer, Aug. 1993.

Want et al. "An overview of the ParcTab Ubiquitous computer experiment", IEEE Personal communications, Dec. 1995.

Schilit et al. "Context-Aware Computing Applications", IEEE Workshop of Mobile Computing Systems and Applications, Dec. 8-9, 1994.

Schilit et al. "Customizing mobile Applications", Proceedings USENIX Symposium on Mobile & Location-independent computer, Aug. 1993.

Schilit et al. "The ParcTab Mobile computing system", Proceedings Fourth Workshop of Workstation Operating systems, Oct. 1993.

Douglas B. Terry, "A tour through Tapestry", Xerox Corporation, Aug. 1993.

Goldberg, "Using collaborative filtering to weave an information tapestry", Communication sof the ACM, Dec. 1992, vol. 35, No. 12, pp. 61-70.

Schmandt et al. "Desktop Audio", (also published as "Getting the Word", Unix Review, vol. 7, No. 10, pp. 54-62, Oct. 1989).

Crawford et al. "Videomatic switching: systems and services", Mapping New Applications onto New Technologies, Digital communications, International Zurich Seminar on Digital object Identifier, pp. 37-43, 1988.

AT&T Technology, Products, Systems, and Services, "Electronic Messaging", vol. 3, No. 2, 1989.

Gould et al. "Speech Filing—An office system for principals", IBM Systems Journal, vol. 23. No. 1, 1984, Armonk, New York, pp. 65-81.

DellaFera et al. "Section E.4.1 Zephyr Notification Service", Project Athena Technical Plan, Jun. 5, 1989.

M. Schulz and L. Payne, "Providing Multimedia Facilities in a Workstation Independent Form", Proceedings of the SST 1990, Australasian Speech Science and Technology Association, pp. 486-491.

Want et al. "The ParcTab Ubiquitous computer experiment", Mobile Computing, The Kluwer International Series in Engineering and Computer Science, 1996, vol. 353, 45-101.

Edwards, W. Keith, "Montage: An X-based multimedia electronic mail system", Graphics, Visualization & usability Center, Georgia Institute of Technology, Oct. 1992.

Stevens, Curt "Automating the creation of Information Filters", Communications of the ACM, vol. 35, No. 12, Dec. 1992.

Neumann, Peter G., "Avoiding Weak Links", Communications of the ACM, vol. 35, No. 12, Dec. 1992.

Traub, Joseph F., "A tribute to Allen Newell 1927-1992", Communications of the ACM, vol. 35, No. 12, Dec. 1992.

Schmandt et al., "A conversational telephone messaging system", IEEE Transactions on Consumer Electronics, Aug. 1984, vol. CE-30.

Schmandt et al., "An audio and telephone server for multi-media workstations", Proceedings, Second IEEE Conference on Computer Workstations, IEEE, Santa Clara, CA, 1988.

Pollock, Stephen, "A rule-based message filtering system", ACM Transactions on Office Information Systems, vol. 6, No. 3, Jul. 1988, pp. 232-254.

Gifford, "An architecture for large scale information systems", ACM, pp. 161-170, 1985.

Arons et al., "The VOX Audio Server", Multimedia '89, Apr. 20-23, 1989, Ottawa, Ontario, $2^{nd}$ IEEE Comsoc International Multimedia Communications Workshop, 1989.

Kent et al., "Browsing Electronics Mail: Experiences Interfacing a mail system to a DBMS", Proceedings of the $14^{th}$ VLDB Conference, pp. 112-123, Los Angeles, California 1988.

Denning, Peter J., "Electronic Junk", Communications of the ACM, vol. 25, No. 3, Mar. 1982.

Mackay et al., "How do experienced information lens users use rules?", Center for Information Systems Research, Massachusetts Institute of Technology, Oct. 1988.

Belkin et al., "Information filtering and Information retrieval: two sides of the same coin?", Communications of the ACM, vol. 35, No. 12, Dec. 1992.

Malone et al., "Intelligent Information-sharing systems", Communications of the ACM, vol. 30, No. 5, May 1987.

Lutz et al., "MAFIA—An active mail-filter-agent for an intelligent document processing support", excerpt from "Multi-User interfaces and applications" (Gibbs et al., Editors), pp. 16-32, 1990.

Sellers, B. Henderson "Technical Correspondence: Modularization and McCabes's cyclomatic complexity", Communications of the ACM, vol. 35, No. 12, Dec. 1992.

Bowen et al., "The datacycle architecture", Communications of the ACM, vol. 35, No. 12, Dec. 1992.

Foltz et al., "Personalized information delivery: an analysis of information filtering methods", Communications of the ACM, vol. 35, No. 12, Dec. 1992.

Ram, Ashwin, "Natural language understanding for information-filtering systems", Communications of the ACM, vol. 35, No. 12, Dec. 1992.

Stadnyk et al., "Modeling users' interests in information filtering", Communications of the ACM, vol. 35, No. 12, Dec. 1992.

Guest Editors, "Information Filtering", Communications of the ACM, vol. 35, No. 12, Dec. 1992.

Australian Unix Systems User Group Newsletter, vol. 8, No. 6, Dec. 1987.

* cited by examiner

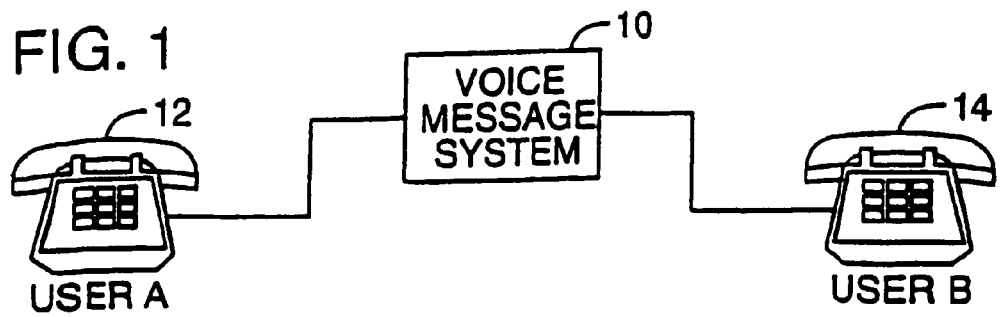
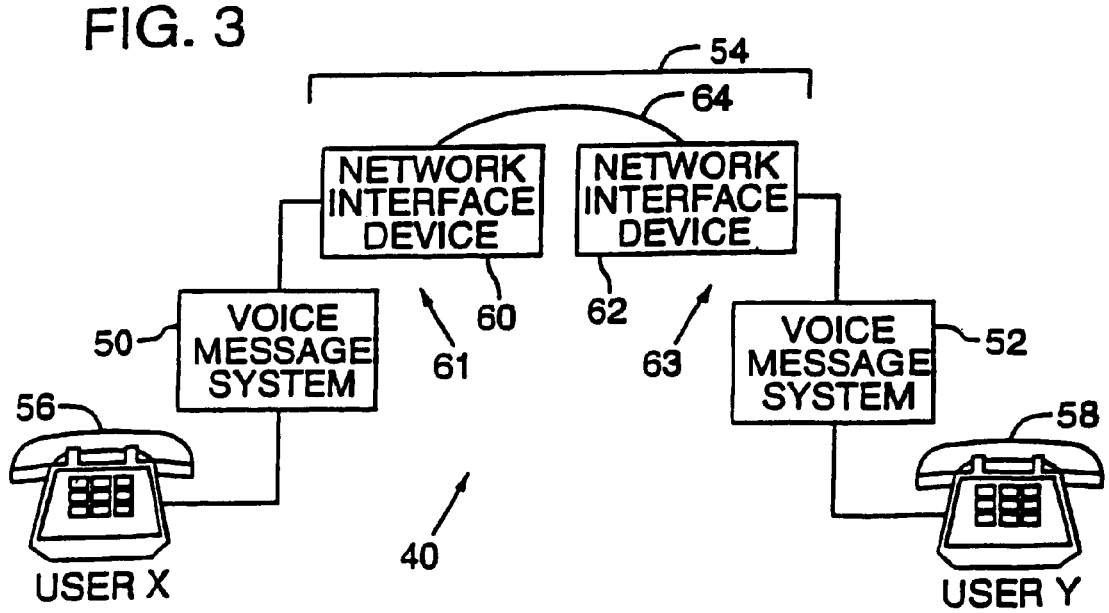

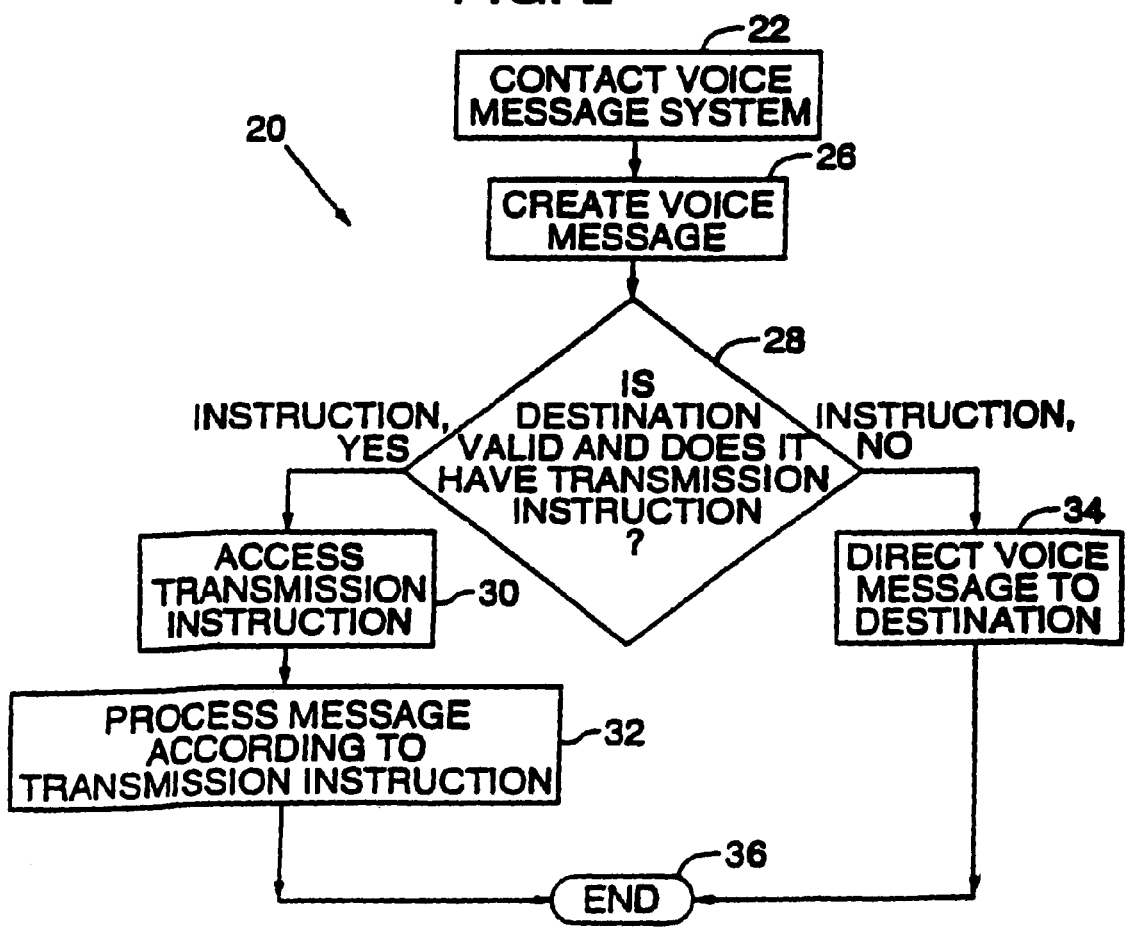

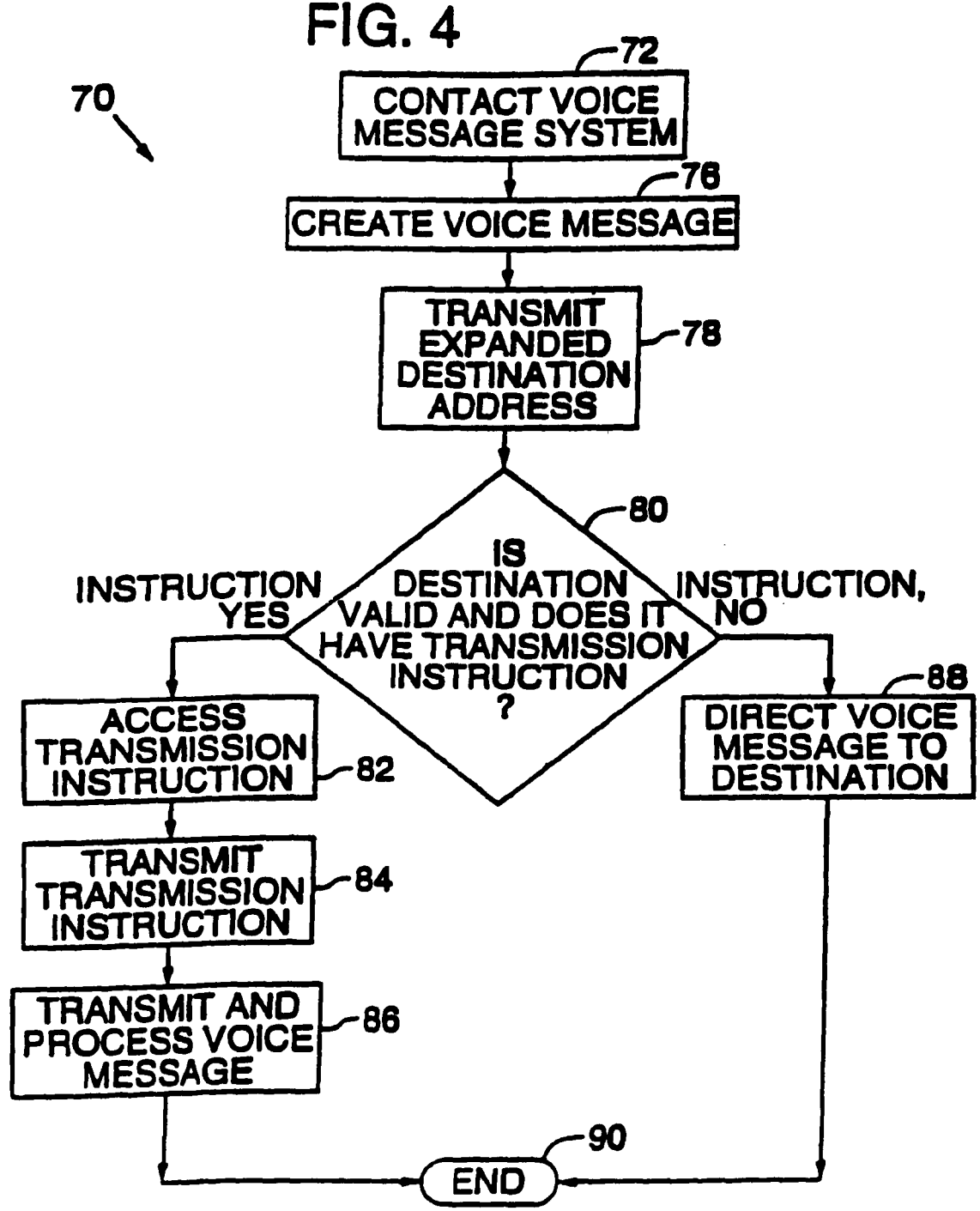

TELEPHONIC VOICE MESSAGE TRANSMISSION CONTROL METHOD

CROSS-REFERENCE TO RELATED APPLICATIONS

This application is a continuation of prior application Ser. No. 10/868,842, filed Jun. 17, 2004, now U.S. Pat. No. 7,224,779 which is a continuation of application Ser. No. 10/656,162, filed Sep. 8, 2003, now U.S. Pat. No. 7,221,744 which is a continuation of prior application Ser. No. 09/756,693, filed Jan. 9, 2001, now U.S. Pat. No. 6,697,459, which is a prior divisional of application Ser. No. 08/817,443, filed Aug. 22, 1997, now U.S. Pat. No. 6,173,043, which is a prior continuation-in-part of application Ser. No. 08/684,318, filed Jul. 18, 1996, now U.S. Pat. No. 5,687,220, which is a prior continuation of application Ser. No. 08/332,102, filed Oct. 31, 1994, abandoned, which is incorporated herein by reference in its entirety.

TECHNICAL FIELD

The present invention relates to telephonic voice message systems, sometimes referred to as Voice Mail systems and, in particular, to a method of controlling transmission of telephonic voice message data in such systems.

BACKGROUND OF THE INVENTION

Electronic interpersonal communication may be conducted in a variety of formats including direct telephonic voice communication, facsimile document communication, electronic mail communication, and telephonic voice message communication. Facsimile document communication and electronic mail communication may be characterized as document-based, and the other two formats as voice-based.

Direct telephonic voice communication is unique among these formats in that it requires contemporaneous participation by all parties. In many business situations, the requirement for contemporaneous participation is unnecessary, disruptive, and time consuming. As a consequence, the noncontemporaneous communication formats of facsimile document communication, electronic mail communication, and telephonic voice message communication are becoming preferred over direct telephonic voice communication for many situations.

With increasing volumes of information being transmitted by the different noncontemporaneous communication formats, recipients of the information can be burdened by the effort of sorting through and reviewing the information. In this regard, the document basis of facsimile and electronic mail communication formats allow a recipient to visually sort through large amounts of information relatively quickly.

In contrast, voice-based information or messages on telephonic voice message systems are reviewed aurally, which requires that the recipient review telephonic voice messages serially. With increasing numbers of telephonic voice messages, the review of messages by a recipient can become excessively time-consuming and burdensome.

This burden can be exacerbated because conventional telephonic voice message systems provide the recipient with little control over which information is received over the system. In contrast, some conventional communication systems other than telephonic voice message systems provide the recipient of the information with at least minor control over the information received. For example, some direct telephonic communication systems include features such as call forwarding. Some electronic mail systems include message notification prioritization based on the identity of the sending party.

EP-A-0 588 101 discloses a message storage and retrieval system employing selected caller processing which uses automatic number identification (ANI) to implement several voice message instruction features such as message forwarding, message priority, customized greetings and single digit call-back to the voice message originator. The instructions are executed on voice messages that have already been transmitted and stored by a sender in the recipient's voice message system.

SUMMARY OF THE INVENTION

An object of the present invention is, therefore, to provide a method of controlling transmission of telephonic voice message information.

Another object of this invention is to provide such a method in which the recipient controls the telephonic voice message data to be received.

A further object of this invention is to provide such a method in which the telephonic voice message data to be received is controlled according to the voice message system address of the sender.

The present invention is directed to a method of controlling transmission of voice messages or information via telephonic voice message systems. In a preferred embodiment, a person speaks into a telephone to create or originate a voice message to be sent to another person. The recipient of the message has an assigned address or "mailbox" on the telephonic voice message system analogous to a telephone number and referred to as the destination voice message address. The sender may have an assigned address on and be a system user of the voice message system or may be a system visitor without a permanent system address and who, for example, accesses the system after an unsuccessful direct telephone call to the recipient.

After the sender has originated the voice message, the sender directs the voice message to the recipient by sending the voice message and the destination address to the telephonic voice message system. In many systems, the originator keys the destination address number into a DTMF telephone keypad. Other voice message systems include voice recognition subsystems that allow the originator to enter the destination address merely by stating it. Upon receipt of the voice message and the destination address, the telephonic voice message system determines whether the destination voice message address is valid and whether it has a specified voice message transmission instruction previously selected by the recipient for controlling voice messages directed to the destination address.

Preferably, a variety of voice message transmission instructions can be selected by the recipient. The selectable voice message transmission instructions can include, for example, transmitting the telephonic voice message data to an alternate or additional voice message destination having a voice message address different from the destination voice message address, determining whether the origination address is included in a list of at least one acceptable origin address and transmitting the voice message to the destination only if the origination address is included in the preselected set, or determining whether the origination address is included in a list of at least one unacceptable origin address and blocking transmission of the voice message to the destination address whenever the origination address is included in the list.

The selectable voice message transmission instructions also can include assigning voice messages from a specified origination address with a delivery priority (e.g., high or low) that determines the sequence in which messages are retrieved by the recipient, or designating voice messages from a specified origination address as being private so the messages cannot be copied or forwarded. If the voice message system includes a voice recognition and conversion subsystem, the selectable voice message transmission instructions can include converting voice messages to electronic mail or facsimile documents and delivering them to a selected electronic mailbox or facsimile device, respectively.

Whenever the destination address has a specified voice message transmission instruction for controlling transmission of the telephonic voice message data, the voice message system processes the voice message according to the instruction. Whenever the destination address has no specified voice message transmission instruction for controlling transmission of the telephonic voice message data, the voice message is transmitted to the destination address and stored for retrieval by the recipient, as in conventional operation of voice message systems.

Additional objects and advantages of this invention will be apparent from the following detailed description of preferred embodiments thereof which proceeds with reference to the accompanying drawings.

BRIEF DESCRIPTION OF THE DRAWINGS

FIG. 1 is a simplified schematic block diagram of a telephonic voice message system in which voice message transmission is controllable according to the method of the present invention.

FIG. 2 is a flow diagram showing a method of controlling voice message transmission in the system of FIG. 1 according to the present invention.

FIG. 3 is a simplified schematic block diagram of a pair of networked telephonic voice message systems in which voice message transmission is controllable according to the method of the present invention.

FIG. 4 is a flow diagram showing a method of controlling voice message transmission in the system of FIG. 3 according to the present invention.

DETAILED DESCRIPTION OF PREFERRED EMBODIMENTS

FIG. 1 represents a generally conventional telephonic voice message apparatus or system 10 that controls transmission, delivery, and storage of voice messages, which are sometimes referred to as Voice Mail messages. Telephonic voice message system 10 may be of the type manufactured and sold by any of a large number of manufacturers that include VMI, Comverse, Centigram, Rohm, Northern, or Boston Technology. Exemplary models of voice message system 10 may include the INFINITY 2 manufactured by Comverse Technology Inc. of Woodbury, N.Y. and the ONE-VIEW manufactured by Centigram Communications of San Jose, Calif.

Voice message system 10 may be telephonically accessed by multiple system users, each of which has an assigned message address or "mailbox," as well as system visitors who do not have assigned message addresses on voice message system 10. For reference purposes, voice message system 10 is shown connected to telephones 12 and 14 by which, respectively, a message sender (user A) and a message recipient (user B) access voice message system 10. It will be appreciated that telephones 12 and 14 may be located anywhere and can access voice message system through any switching or transmission systems, including a private branch exchange (PBX), local public switched telephone network (PSTN), or long distance or international telephone lines or channels. Telephones 12 and 14 require only basic capabilities (e.g., a DTMF keypad) to be operable with voice message system 10.

For purposes of clarity, message senders and recipients having assigned voice message addresses on voice message system 10 are referred to herein as system users. Voice message system 10 is also capable of receiving voice messages from others, who are referred to herein as system visitors. The following description is directed mainly to communication between system users A and B, but is similarly applicable to communication between a system visitor and either of system users A and B.

In conventional operation of voice message system 10, user A sends user B a voice message by telephoning voice message system 10 from telephone 12 and speaking into it to create a voice message or voice message data. Voice message system 10 automatically digitizes the voice message for storage User A directs the voice message to its destination (e.g., user B) and adds any conventional sender delivery commands for voice message system 10 (e.g., message delivery priority) by keying the destination message address and sender delivery command codes on the DTMF keypad of telephone 12. Alternatively, voice message system 10 includes a voice recognition subsystem that allows the sender to enter the destination address and any sender delivery commands merely by stating them.

Voice message system 10 associates the digitized voice message data with the destination message address and sender delivery commands and stores them for retrieval by the recipient (user B). Typically, voice message system 10 delivers to telephone 14 an indication that a message is available for retrieval by user B. Alternatively, user B may call voice message system 10 to check, for any voice messages. In generally this manner, a system user A on virtually any voice mail system is able to send a voice message to another system user B.

In accordance with the present invention, users A and B, as well as any others of the many system users, can control the transmission of voice messages or information directed to their message addresses by selecting preprogrammed voice message transmission instructions that are stored on voice message system 10. With increasing numbers of telephonic voice messages and voice message system users, voice message transmission instructions selectable by the recipient can prevent voice message system 10 from becoming inconvenient or burdensome to use.

FIG. 2 is a flow diagram showing a preferred method 20 of controlling transmission of voice message data according to the present invention. Voice message transmission control method 20 is described with reference to communication between systems users A and B, but is similarly applicable to communication from a system visitor to a system user.

Process block 22 represents that user A makes telephone contact with voice message system 10. The telephone contact with voice message system 10 may be specifically initiated by user A, or user A may be automatically transferred to voice message system 10 as a result of attempting to make a direct telephonic call to user B.

Process block 26 represents that user A speaks into a telephone to create or originate for user B a voice message from which voice message system 10 generates and stores voice message data or information. Voice message system 10 also acquires and stores the message address for user B and any sender delivery commands selected by user A. As is known in the art, the message address for user B may be keyed into a DTMF telephone keypad by user A or may have been previously acquired by voice message system 10. Alternatively, voice message system 10 includes a voice recognition subsystem that allows the sender to enter the destination address and any sender delivery commands merely by stating them.

Inquiry block 28 represents an inquiry whether the destination message address is a valid address on voice message system 10 and whether there is a specified voice message transmission instruction previously selected by user B for controlling voice messages directed to the destination message address. This inquiry takes place in response to the entry by user A of a destination message address or any sender delivery commands that are stored for delivery to the destination voice message address of user B. For example, voice message system 10 confirms whether the destination message address is a valid address and reviews a stored first listing of destination message addressees that have specified voice message transmission instructions.

If the destination message address is valid and has a specified voice message transmission instruction, inquiry block 28 proceeds to process block 30. If the destination message address is valid and does not have a specified voice message transmission instruction, inquiry block 28 proceeds to process block 34. If the destination message address is not valid, an invalid address message is delivered to user A.

Process block 30 represents that voice message system 10 accesses the specified voice message transmission instructions for the destination message address from a stored listing of destination message addresses and associated specified voice message transmission instructions. It will be appreciated that voice message system 10 is analogous to a computer by being programmable and having large information storage capacity. Storing the listings and programming voice message system 10 to create, review and access the listings is within the capabilities of persons skilled in the art.

The selectable voice message transmission instructions can include, for example, transmitting the telephonic voice message data to an alternate or additional voice message destination having a voice message address different from the destination voice message address, determining whether the origination address is included in a list of at least one acceptable origin address and transmitting the voice message to the destination only if the origination address is included in the preselected set, or determining whether the origination address is included in a list of at least one unacceptable origin address and blocking transmission of the voice message to the destination address whenever the origination address is included in the list.

The selectable voice message transmission instructions also can include assigning voice messages from a specified origination address with a priority (e.g., high or low) that determines the sequence in which messages are retrieved by the recipient, or designating voice messages from a specified origination address as being private so the messages cannot be copied or forwarded. If voice message system 10 includes a voice recognition and conversion subsystem, the selectable voice message transmission instructions can include converting voice messages to text data suitable for delivery as electronic mail to a selected electronic mailbox. The selectable voice message transmission instructions can further include converting the text data to a facsimile document suitable for delivery to a facsimile device.

User B selects voice message transmission instructions by keying corresponding command or selection codes on the DTMF keypad of telephone 14 in response to interactive voice prompts from voice message system 10. Alternatively, voice message system 10 includes a voice recognition subsystem that allows user B to select voice message transmission instructions merely by stating the corresponding command or selection codes. As another alternative, user B can select voice message transmission instructions by entering corresponding command or selection codes into voice message system 10 with a personal computer in communication with system 10.

Process block 32 represents that voice message system 10 processes the voice message data in accordance with any specified voice message transmission instruction.

Process block 34 represents that voice message system 10 directs the voice message data to the destination message address as a conventional voice message, stores it for retrieval by the recipient (user B), and provides an indication at telephone 14 that a voice message is available for retrieval. It will be appreciated that the internal operation of voice message systems from different manufacturers will vary. For example, directing voice message data to the destination message address may or may not include shifting or transmitting voice message data. With regard to the present invention, the signal processing details by which a particular voice message system makes a voice message available for retrieval are not material.

Process block 36 represents that method 20 is completed.

Voice message transmission control method 20 has been described with reference to a single otherwise conventional voice message system 10. The voice message transmission control method of the present invention is also applicable to a network of at least two separate voice message systems. With the increased numbers of users and potential voice messages on such a network, recipient control over voice messages becomes particularly desirable.

FIG. 3 shows a telephonic voice message apparatus 40 having a pair of generally conventional telephonic voice message systems 50 and 52 that are operable independently and communicate with each other through a voice message system network 54. Telephonic voice message systems 50 and 52 are preferably similar to voice message system 10.

Voice message systems 50 and 52 may be telephonically accessed by multiple system users of either system, each system user having an assigned message address or "mailbox," as well as system visitors who do not have message addresses on voice message system 50 or 52. For reference purposes, voice message systems 50 and 52 are shown connected to telephones 56 and 58 by which a message sender (user X) and a message recipient (user Y) access voice message systems 50 and 52, respectively. Telephones 56 and 58 provide substantially the same access to respective voice message systems 50 and 52 that telephones 12 and 14 provide to voice message system 10.

Voice message system network 54 includes network interface nodes or devices 60 and 62 through which voice message systems 50 and 52 access each other, as well as other voice message systems connected to network 54 but not shown. Network interface devices 60 and 62 may be, for example, an APOGEE WORLDGATE manufactured by the assignee of this application. Voice message system 50 and network interface device 60 compose a first voice message network subsystem 61, and voice message system 52 and network interface device 62 compose a second voice message network subsystem 63. Network interface devices 60 and 62 are operable independently of and may each serve one or more voice message systems. Network interface devices 60 and 62 are interconnected by at least one telecommunication channel 64, which is preferably a high capacity digital telecommunication channel over which large volumes of voice message data can be transmitted efficiently.

Due to the independent operability of voice message systems 50 and 52, the method by which a recipient controls voice messages directed to him preferably differs from voice message transmission control method 20. FIG. 4 is a flow diagram showing a preferred method 70 of controlling transmission of voice message data between independently operable voice message systems 50 and 52 in accordance with the present invention. Voice message transmission control method 70 is described with reference to communication between system users X and Y, but is similarly applicable to communication between. a system user and a system visitor.

Process block 72 represents that user X makes telephone contact with voice message system 50. The telephone contact with voice message system 50 would typically be specifically initiated by user X. If user X attempts to make a direct telephonic call to user Y and is redirected to a voice message system, user X typically would be transferred to voice message system 52 with which user Y is associated. A voice message left by user X directly on voice message system 52 would preferably be processed by voice message transmission control method 20.

Process block 76 represents that user X speaks into telephone 56 to create or originate for user Y a voice message from which voice message system 50 generates and stores voice message data or information. Voice message system 50 also acquires and stores the message address for user Y and any sender delivery instructions selected by user X. As is known in the art, the destination message address may be keyed into a DTMF telephone keypad by user X or may have been previously acquired by voice message system 50. Alternatively, voice message system 50 includes a voice recognition subsystem that allows user X to enter the destination address and any sender delivery commands merely by stating them. Since the destination message address does not reside on voice message system 50, user X would typically have to enter an expanded destination message address that includes an indication that it resides on voice message system 52.

Process block 78 represents that expanded destination message address of recipient's (user Y's) telephone 58 is transmitted from voice message system 50 to associated network interface device 60.

Inquiry block 80 represents an inquiry whether the destination message address is a valid address on voice message system 52 and whether there is a specified voice message transmission instruction previously selected by user Y for controlling voice messages directed to the destination message address. In a first preferred embodiment, voice message system 50 transmits the expanded destination message address to associated network interface device 60, which forwards the destination message address over channel 64 to network interface device 62 associated with voice message system 52. Network interface device 62 confirms whether the destination message address is a valid address of voice message system 52 and reviews a stored first listing of destination message addressees that have specified voice message transmission instructions. In this embodiment, information regarding valid addresses of voice message system 52 and their associated voice message transmission instructions are periodically transferred from system 52 to network interface device 62.

In a second preferred embodiment, the expanded destination message address is transmitted to voice message system 52 via network interface device 60, channel 64, and network interface device 62. In response to a query from network interface device 62, voice message system 52 confirms whether the destination message address is a valid address and reviews a stored first listing of destination message addressees that have specified voice message transmission instructions.

If the destination message address is valid and has a specified voice message transmission instruction, inquiry block 80 proceeds to process block 82. If the destination message address is valid and does not have a specified voice message transmission instruction, inquiry block 80 proceeds to process block 88. If the destination message address is not valid, an invalid address message is provided to user X by way of the sender's voice message address.

Process block 82 represents that the specified voice message transmission instructions for the destination message address are accessed from a stored listing of destination message addresses and associated specified voice message transmission instructions. In the first and second preferred embodiments, the instructions are accessed by network interface device 62 and voice message system 52, respectively.

It will be appreciated that voice message systems 50 and 52 and network interface devices 60 and 62 are analogous to computers by being programmable and having large information storage capacity. Storing the listings on and programming voice message system 52 or network interface devices 62 to create, review and access the listings is within the capabilities of persons skilled in the art. The voice message transmission instructions and manner of selecting them can include those described above with reference to voice message system 10. Alternatively, network 54 could provide operator assistance services by which user Y could select voice message transmission instructions by calling and informing a network operator of the instructions the user has selected.

Process block 84 represents that a signal carrying the voice message transmission instructions is transmitted to network interface device 60 via network interface device 62 and channel 64. Thus, a message recipient (user Y) can block or reroute selected messages before there is an attempt to transmit them to the recipient as designated by the message originator (user X).

Process block 86 represents that voice message system 50 transmits the voice message data to network interface device 60, which processes the voice message data in accordance with any specified voice message transmission instruction. Thus, because of the noncontemporaneous nature of voice message communication, the message originator and recipient are not in communication during the processing of voice message transmission instructions established by the recipient.

Process block 88 represents that voice message system 50 directs the voice message data to the destination message address on voice message system 52 via network 54. Voice message system 52 stores the voice message data for retrieval by the recipient (user Y) and provides an indication at telephone 58 that a voice message is available for retrieval.

Process block 90 represents that method 70 is completed.

To control costs and message retrieval time, large entities using voice messaging need to regulate the originators of incoming voice messages and restrict the number of them. Significant costs include delivery system transient memory storage capacity, local access charges (e.g., 800 number or Bell Operating Company access charges), potential loss of opportunity (e.g., recipient is in different place and time from place and time of message transmission), and message transmission costs. The following example demonstrates the capability of the invention to achieve significant cost savings by allowing a recipient to block or re-route selected messages before they are transmitted to the recipient as designated by the message originator. For purposes of illustration only, the example is described with reference to the FIG. 3 embodiment.

EXAMPLE

User X wants to leave a message for uses Y. User X specifies certain delivery instructions such as routine delivery scheduling and nonconfidential message, but user Y has specified for messages addressed to him different message delivery instructions that include location re-routing, priority delivery, private message, encrypted message, and delivery certification. Processing of the message by user X proceeds as follows.

User X records a message on voice message system 50 and, upon completing his message, proceeds to other, unrelated activities. voice message system 50 communicates with network interface device 60 to indicate the presence of the message user X left and gives delivery instructions including the delivery address, length, and urgency of the message. Network interface device 60 communicates the delivery instruction information across telecommunication channel 64 to network interface device 62, which in turn communicates with voice message system 52 to validate the delivery address and check for any alternative delivery instructions placed by user Y in either network interface device 62 or voice message system 52.

Voice message system 52 provides back to network interface device 62 the alternative instructions specified by user Y and a confirmation of a valid delivery address. The alternative instructions and confirmation are then transmitted across telecommunication channel 64 to network interface device 60 to substitute the message delivery instructions of user Y for those of user X. Because user Y specified that messages addressed to him be re-routed, a significant cost saving is achieved as a consequence of the nontransmission of the message of user X to the original delivery address of user Y.

The processing of message setup instructions is analogous to that for real-time telephone call setup instructions, and in both cases the cost is relatively low. Neither user X nor user Y incurs a cost above that of normal network overhead; therefore, the transmission of voice message transmission instructions achieves the savings objective for user Y.

In response to the change in message instructions, network interface device 60 can reroute the message in accordance with the alternative instructions, which at a minimal cost change the delivery address, priority, confidentiality, encryption, and certification to those specified by user Y. For, example, if user Y specifies an address on the same system as that of the address of user X, the only cost incurred to deliver the message would be the local access charge to point the message to the delivery address commanded by user Y.

This example demonstrates that no message originator or recipient is on line during message management processing of a previously recorded message, which processing is based on functions a message nonoriginator has defined. This example also shows the invention can be implemented in a local system, local area network (LAN), and wide area network (WAN) environment. Skilled persons will appreciate that the message management functions carried out by way of example with reference to the FIG. 3 system can be distributed to other system components, such as those of the system of FIG. 1.

Skilled workers will recognize that the above-described voice message transmission example would also be applicable to other types of non-contemporaneous message transmission such as those found in facsimile document store and forward services and electronic mail, and that the communications medium employed need not be a telecommunications channel.

Skilled workers will further recognize that many changes may be made to the details of the above-described embodiment of this invention without departing from the underlying principles thereof. For example, voice message transmission control method 70 is described with reference to separate network interface devices 60 and 62 for respective voice message systems 50 and 52. As an alternative embodiment, voice message transmission control method 70 could operate with voice message systems 50 and 52 and only a single network interface device in direct communication with both message systems. The scope of the present invention should be determined, therefore, only by the following claims.

What is claimed is:

1. A method of controlling the transmission of digitized voice data in a computer network, the method comprising the steps of:
    obtaining the digitized voice data generated by a sender at an origination address located on a first voice message subsystem associated with the sender;
    prior to transmitting the digitized voice data from said origination address to a recipient, obtaining by said first voice message subsystem a recipient address and a recipient transmission instruction located on a second voice message subsystem associated with the recipient over the computer network; and
    transmitting from said first voice message subsystem the digitized voice data to said recipient address in accordance with said recipient transmission instruction.

2. The method of claim 1, further comprising storing the digitized voice data.

3. The method of claim 1, further comprising delivering the digitized voice data to an electronic mailbox.

4. The method of claim 1, further comprising connecting to a telephone of the sender.

5. The method of claim 1, further comprising storing the recipient transmission instruction.

6. The method of claim 1, further comprising transmitting the digitized voice data to its destination.

7. A method of controlling digitized voice data in a computer network, the method comprising the steps of:
    receiving the digitized voice data;
    prior to transmitting the digitized voice data from an origination address located on a first voice message subsystem of a sender to a recipient, obtaining by said first voice message subsystem a recipient address and a recipient transmission instruction located on a second voice message subsystem associated with the recipient;
    storing the recipient transmission instruction on the first voice message subsystem;
    processing the stored recipient transmission instruction; and
    transmitting from said first voice message subsystem the digitized voice data to the recipient address in accordance with the recipient transmission instruction.

8. A method of controlling digitized voice data in a computer network, the method comprising the steps of:
    receiving the digitized voice data;
    associating the digitized voice data with an origination address located on a first voice message subsystem of a sender;
    prior to transmitting the digitized voice data from said origination address of the sender to a recipient, obtaining by said first voice message subsystem a recipient address and a recipient transmission instruction located on a second voice message subsystem associated with the recipient over the computer network;

processing the recipient transmission instruction; and transmitting from said first voice message subsystem the digitized voice data to the recipient address in accordance with the recipient transmission instruction.

9. A method of controlling the transmission of message data in a computer network, the method comprising the steps of:

obtaining the message data generated by a sender at an origination address located on a first message subsystem associated with the sender;

prior to transmitting the message data from said origination address to a recipient, obtaining by said first message subsystem a recipient address and a recipient transmission instruction located on a second message subsystem associated with the recipient over the computer network; and transmitting from said first message subsystem the message data to said recipient address in accordance with said recipient transmission instruction.

10. The method of claim 9, further comprising storing the message data.

11. The method of claim 9, further comprising transmitting the message data to its destination.

12. The method of claim 9, further comprising delivering the message data to an electronic mailbox.

13. The method of claim 9, further comprising connecting to a telephone of the sender.

14. The method of claim 9, further comprising storing the recipient transmission instruction.

15. A method of controlling message data in a computer network, the method comprising the steps of:

receiving the message data;

prior to transmitting the message data from an origination address located on a first message subsystem of a sender to a recipient, obtaining by said first message subsystem a recipient address and a recipient transmission instruction located on a second message subsystem associated with the recipient;

storing the recipient transmission instruction on the first message subsystem;

processing the stored recipient transmission instruction; and transmitting from said first message subsystem the message data to the recipient address in accordance with the recipient transmission instruction.

16. A method of controlling message data in a computer network, the method comprising the steps of:

receiving the message data;

associating the message data with an origination address located on a first message subsystem of a sender;

prior to transmitting the message data from said origination address of the sender to a recipient, obtaining by said first message subsystem a recipient address and a recipient transmission instruction located on a second message subsystem associated with the recipient over the computer network;

processing the recipient transmission instruction; and transmitting from said first message subsystem the message data to the recipient address in accordance with the recipient transmission instruction.

17. A method of controlling the transmission of message data in a computer network from a sender having an origination address located on a first message subsystem associated with the sender to a recipient having a first destination address, the method comprising;

accepting by said first message subsystem at least one instruction from a plurality of instructions located on a second message subsystem associated with the recipient for controlling an initial transmission of the message data to an address associated with the recipient; and processing from said first message subsystem the message data in accordance with said at least one instruction for controlling the initial transmission of message data directed to the recipient.

18. The method of claim 17, wherein the message data is voice data.

19. The method of claim 17, wherein the message data is electronic mail data.

20. The method of claim 17, wherein the message data is facsimile data.

21. The method of claim 17, wherein the message data is text data.

22. The method of claim 17, wherein further comprising:

blocking the transmission of the message data in accordance with said at least one instruction for controlling the initial transmission of message data directed to the recipient.

23. A method of controlling transmission of message data from a sender having an origination address located on a first message subsystem associated with the sender to a recipient having a first destination address, the method comprising:

accepting by said first message subsystem at least one recipient instruction from a plurality of instructions located on a second message subsystem associated with the recipient for controlling an initial transmission of message data to an address associated with the recipient;

accepting message data originating from the sender; and processing from said first message subsystem said message data acquired from the sender in accordance with said at least one instruction for controlling the initial transmission of said message data acquired from the sender.

24. The method of claim 23, wherein the message data is voice data.

25. The method of claim 23, wherein the message data is electronic mail data.

26. The method of claim 23, wherein the message data is facsimile data.

27. The method of claim 23, wherein the message data is text data.

28. The method of claim 23, wherein further comprising:

blocking the transmission of the message data in accordance with said at least one instruction for controlling the initial transmission of message data directed to the recipient.

* * * * *